United States Patent
Schneider et al.

(10) Patent No.: US 9,782,858 B2
(45) Date of Patent: Oct. 10, 2017

(54) ASSEMBLY UNIT WITH STAMPED IN PROFILE ELEMENT AS WELDING ELEMENT FOR PRODUCING A HYBRID COMPONENT

(71) Applicant: RICHARD BERGNER VERBINDUNGSTECHNIK GMBH & CO. KG, Schwabach (DE)

(72) Inventors: Wilhelm Schneider, Rednitzhembach (DE); Juliane Niedermueller, Buechenbach (DE); Klaus Dehlke, Windsbach (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 82 days.

(21) Appl. No.: 14/656,953

(22) Filed: Mar. 13, 2015

(65) Prior Publication Data

US 2015/0258635 A1 Sep. 17, 2015

(30) Foreign Application Priority Data

Mar. 13, 2014 (DE) .......................... 10 2014 003 410

(51) Int. Cl.
| | |
|---|---|
| B23K 31/02 | (2006.01) |
| B23K 35/02 | (2006.01) |
| B23K 11/00 | (2006.01) |
| B21J 15/02 | (2006.01) |
| B23P 19/06 | (2006.01) |

(52) U.S. Cl.
CPC ............. *B23K 31/02* (2013.01); *B21J 15/025* (2013.01); *B23K 11/0066* (2013.01); *B23K 35/0255* (2013.01); *B23P 19/064* (2013.01)

(58) Field of Classification Search
CPC .... B21J 15/025; B23K 11/0066; B23K 31/02; B23K 35/0255; B23P 19/064
USPC ..................................... 228/165, 174; 219/94
See application file for complete search history.

(56) References Cited

U.S. PATENT DOCUMENTS 2,108,409 A * 2/1938 Peron ..................... B21D 51/00
126/390.1
2,191,632 A * 2/1940 Smith ..................... F16C 11/04
16/222

(Continued)

FOREIGN PATENT DOCUMENTS

WO 2012041515 A1 4/2012

*Primary Examiner* — Erin Saad
*Assistant Examiner* — Carlos Gamino
(74) *Attorney, Agent, or Firm* — Laurence A. Greenberg; Werner H. Stemer; Ralph E. Locher

(57) ABSTRACT

A method for producing an assembly unit includes providing the assembly unit with an assembly part and at least one welding element serving for the thermal joining of the assembly part to a basic construction. The welding element is fixed in a through opening of the assembly part with at least one form-locking connection acting in the direction of the center longitudinal axis of the through opening and having a first end face, a second end face facing away from the first, and a peripheral surface that interconnects the end faces. The welding element has two side faces running parallel to each other and pointing away from each other, a profile that ensures the at least one form-locking connection and two transverse surfaces which connect the side faces one to the other.

6 Claims, 10 Drawing Sheets

(56) References Cited

U.S. PATENT DOCUMENTS

| | | | | |
|---|---|---|---|---|
| 2,236,186 | A | * | 3/1941 | Murray, Jr. ............ F22B 37/102 122/6 A |
| 2,860,230 | A | * | 11/1958 | Rapasky ................ B23K 9/007 219/137 R |
| 3,152,628 | A | * | 10/1964 | Strain ................... F16B 37/068 29/432 |
| 3,571,903 | A | * | 3/1971 | Persson ................. B23P 19/062 29/432.1 |
| 3,575,448 | A | * | 4/1971 | Licari ...................... F16B 5/08 219/127 |
| 3,704,507 | A | | 12/1972 | Grube |
| 3,982,612 | A | * | 9/1976 | Krupka ............... F16D 65/0006 188/250 G |
| 3,999,659 | A | * | 12/1976 | Grube ................... B21D 53/24 206/343 |
| 4,119,827 | A | * | 10/1978 | Lenox ................ B23K 11/0066 219/98 |
| 2009/0294410 | A1 | * | 12/2009 | Iwase .................... B21J 15/025 219/91.23 |
| 2011/0211932 | A1 | | 9/2011 | Babej et al. |
| 2013/0034408 | A1 | * | 2/2013 | Maloney ................ F16B 27/00 411/445 |
| 2013/0270229 | A1 | | 10/2013 | Pedersen et al. |
| 2013/0309520 | A1 | * | 11/2013 | Lang ........................ F16B 5/10 428/594 |

* cited by examiner

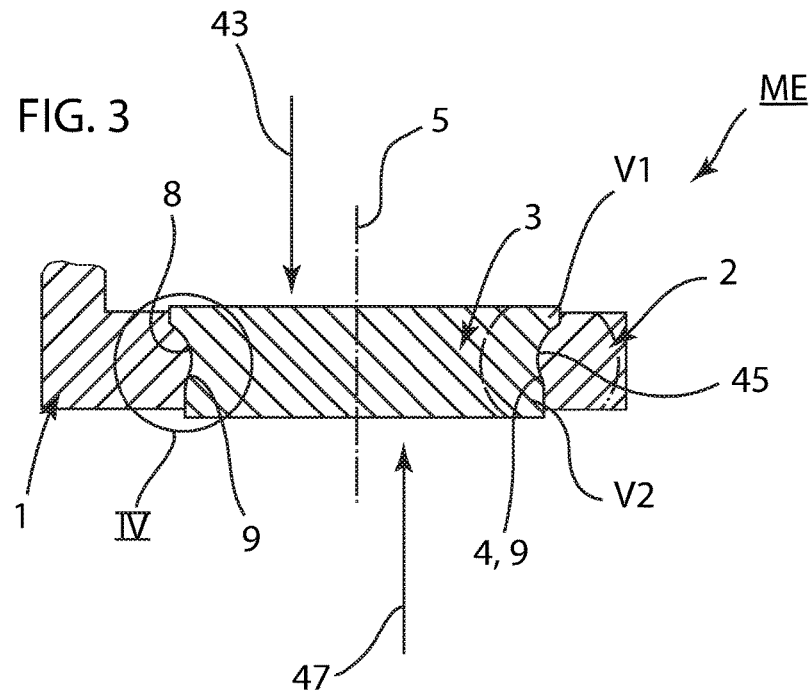
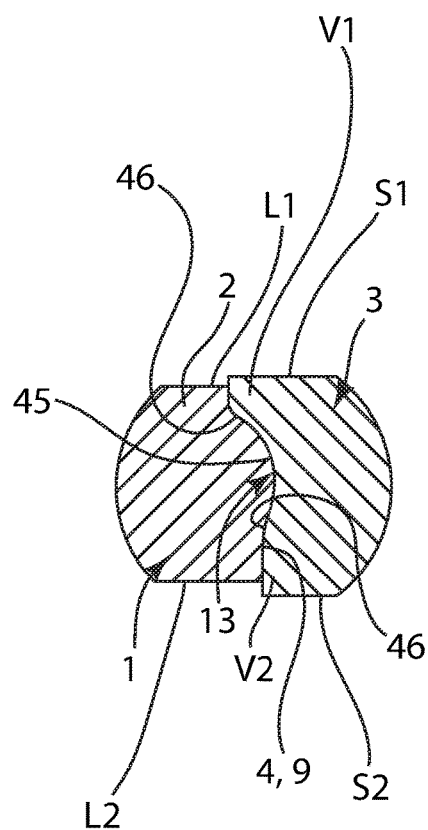
FIG. 3
FIG. 4A
FIG. 4B

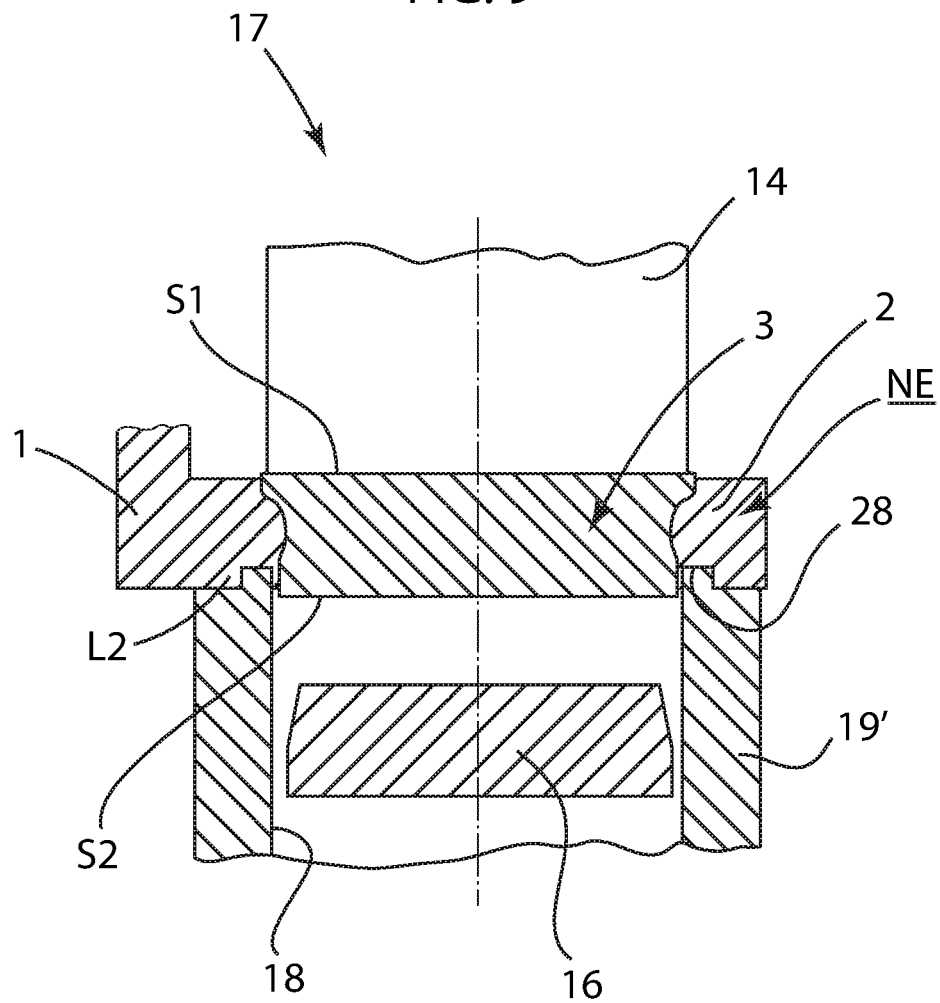

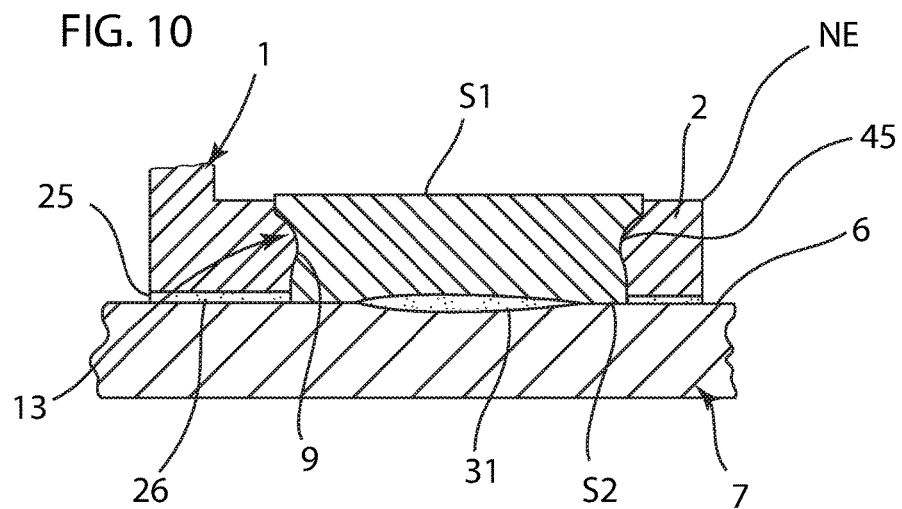
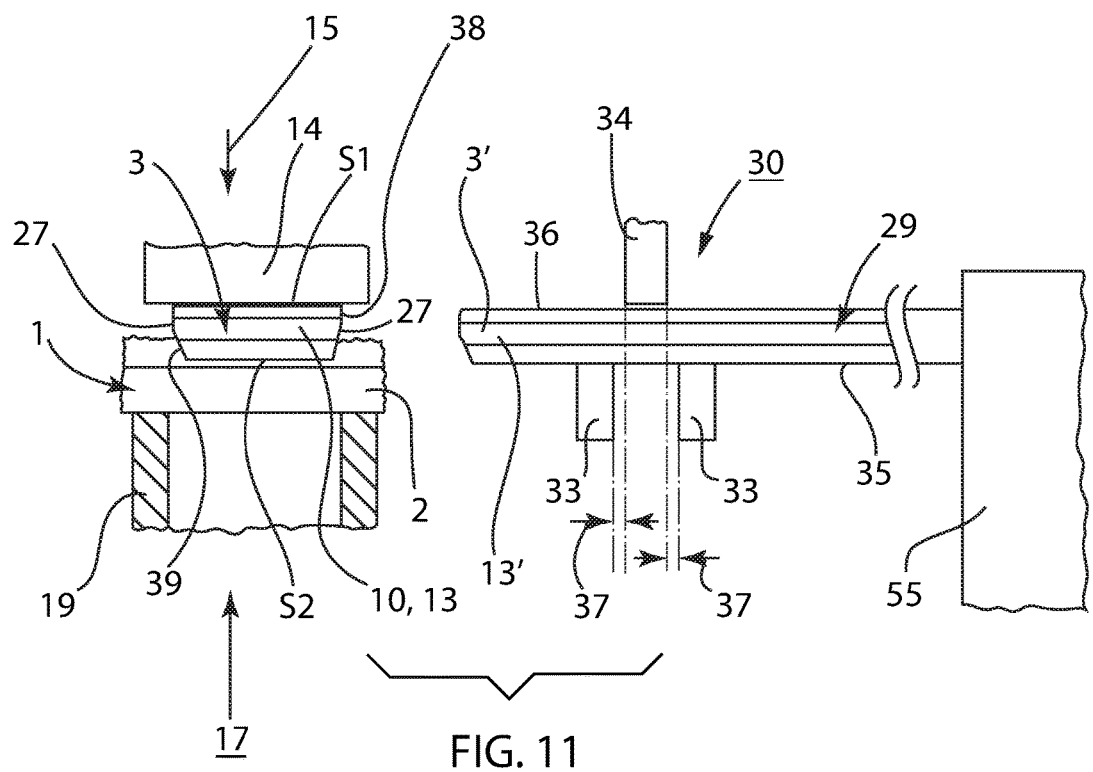

ASSEMBLY UNIT WITH STAMPED IN PROFILE ELEMENT AS WELDING ELEMENT FOR PRODUCING A HYBRID COMPONENT

BACKGROUND OF THE INVENTION

Field of the Invention

The invention relates to a method for producing an assembly unit, which assembly unit comprises an assembly part and at least one welding element serving for the thermal joining, in particular for the welding of the assembly part to a basic construction. The welding element or elements serve(s) to connect the assembly part to the basic construction, which consists of a material which is not thermally joinable to the assembly part. The welding element is of substantially plate-like configuration and accordingly has a first and second end face, which expediently run parallel to each other. The peripheral surface which connects the two end faces one to the other has a profile which serves to create a form closure between the assembly part and the welding element.

For the connection of the welding element to the assembly part, it is introduced into the assembly part in a joining direction, with an end face to the fore, such that it penetrates a through bore present in the assembly part. At least one of the two end faces of the welding element is here aligned with the respective bore rim of the through bore or protrudes beyond it with a protrusion. The through bore is either already present in the assembly part or, if a self-stamping welding element is used, is produced by this itself.

In order to be able to fix the assembly part to the basic construction part with the aid of the welding element, the welding element, which is traditionally formed in the shape of a circular disk, is held in the through bore of the assembly part at least with a form closure in the joining or pull-through direction, wherein said direction runs parallel to the center longitudinal axis of the through bore.

The integral connection, established by means of the welding element, between the assembly part and the basic construction must generally be able to withstand a peeling stress. In the event of such a stress, the assembly part is subjected to a force directed counter to the joining or pull-through direction. There is here the danger that the assembly part is lifted off the basic construction counter to the joining or pull-through direction and said form closure is lifted due to plastic deformation, so that the assembly part detaches from the welding element.

BRIEF SUMMARY OF THE INVENTION

Based on the above, the object of the invention is to propose a method with which an assembly unit of the type stated in the introduction can be produced such that the load bearing capacity of the connection between the welding element and the assembly part is increased in terms of the aforementioned problems.

This object is achieved with a method according to the invention by the provision of a welding element having a peripheral surface which has two side faces, running parallel to each other and pointing away from each other and having a profile that ensures at least one form closure or form lock, and two transverse surfaces, which connect the side faces one to the other. The welding element is introduced into the assembly part in the joining direction, with the second end face to the fore, and with the formation of said form closure or form lock, such that its end faces are aligned with the hole rim regions of the through opening or project with a protrusion above at least one hole rim region.

In comparison with a circular profiled peripheral surface, the profile of a rectilinearly running side face offers greater resistance to a peeling stress of the above-described type or to a lifting-off of the assembly part in the region of the bore rim of the through opening.

Moreover, this particular design of the peripheral surface of the welding element enables it to be produced in a simple manner in production engineering terms, in that longitudinal portions corresponding to welding elements are separated from a strip whose narrow sides, running in the longitudinal direction of the strip, have a profile corresponding to the subsequent side faces of the welding element.

Such a strip can be linked, in terms of the production sequence, with a machining station which establishes the connection between the assembly part and the welding element. This yields the advantage that a supply of individual welding elements from a store, and the associated complex orientation in terms of the spatial location in relation to the assembly part, are dispensed with. The strip can thereby be arranged in a simple manner in such a way that a welding element separated therefrom has the necessary spatial location such that, for example, the second end face of the welding element points in the joining direction, thus in the direction of the assembly part. The strip can also be wound in a space-saving manner into a spiral or a strip roll.

It is particularly advantageous if the strip is produced by an extrusion process. With such a process, a wide variety of profiles, and thus welding elements having differently profiled side faces, can be precisely produced.

BRIEF DESCRIPTION OF THE SEVERAL VIEWS OF THE DRAWING

The invention is now described in greater detail with reference to the appended drawings, wherein, respectively in section, partial section and/or in perspective view:

FIG. 3 shows a section in accordance with the line III-III in FIG. 1, FIGS. 4 A, B show the detail IV from FIG. 3, FIG. 9 shows a punching operation in accordance with FIG. 8, wherein an impression is made, however, in that second hole rim region of the through opening which is assigned to the second end face of the welding element, FIG. 10 shows an assembly unit connected to a basic construction, FIG. 11 shows a schematic representation showing a machining station, for separating a welding element from a strip, and a machining station, arranged downstream in the method sequence, for punching the welding element into an assembly part.

DESCRIPTION OF THE INVENTION

Figure 1:
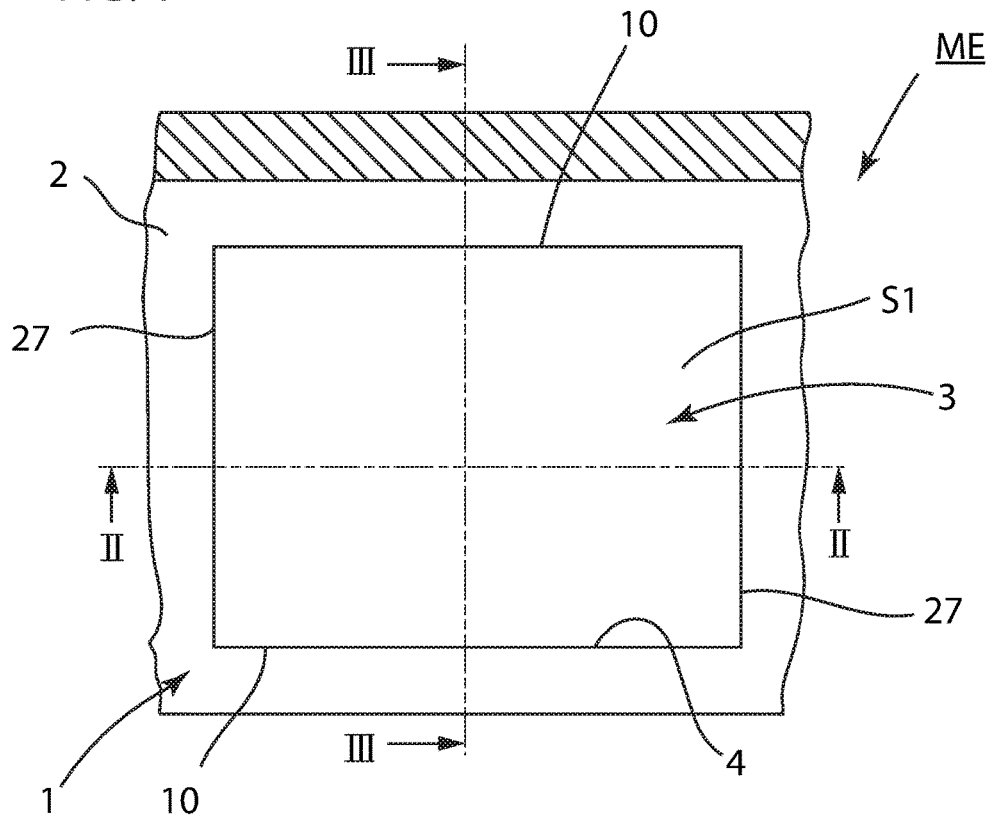
FIG. 1 shows an assembly unit having a welding element in a top view of the first end face of the welding element.

FIG. 1 shows an assembly unit ME, produced with a method according to the invention and having an assembly part 1, of which only a detail, namely a marginal region formed substantially by a flange 2, is shown. Into the substantially plate-like flange 2 are introduced a multiplicity of welding elements 3, wherein in FIG. 1 and also in further representations, for reasons of simplification, only one welding element 3 is shown. The welding element 3 reaches through a through opening 4 in the flange 2 and is fixed therein with a least one form closure acting in the direction of the center longitudinal axis 5 of the through opening 4 (see FIGS. 2-4). The welding element 3 has a first end face S1 and a second end face S2, wherein the end face S2 serves to be connected to a connecting surface 6 of a basic construction 7 with the aid of a welding zone (FIG. 10). The two end faces S1, S2 here run parallel to each other and are connected to each other via a peripheral surface 8 arranged at least partially within the through opening. In order to ensure the above-stated at least one form closure, the peripheral surface 8 has two peripheral portions, namely two side faces 10, running parallel to each other and pointing away from each other, which are provided with a profile 13 that ensures the form closure. The wall 9 of the through opening 4 has a shape substantially complementary to the peripheral surface 8, thus also to the side faces 10. This shape is obtained, in particular with regard to the side faces 10, by virtue of the fact that, when the welding element 3 is introduced into the assembly part 1 or the flange 2, material of the flange 2 is displaced in tandem with filling of the profile 13.

Figure 8:
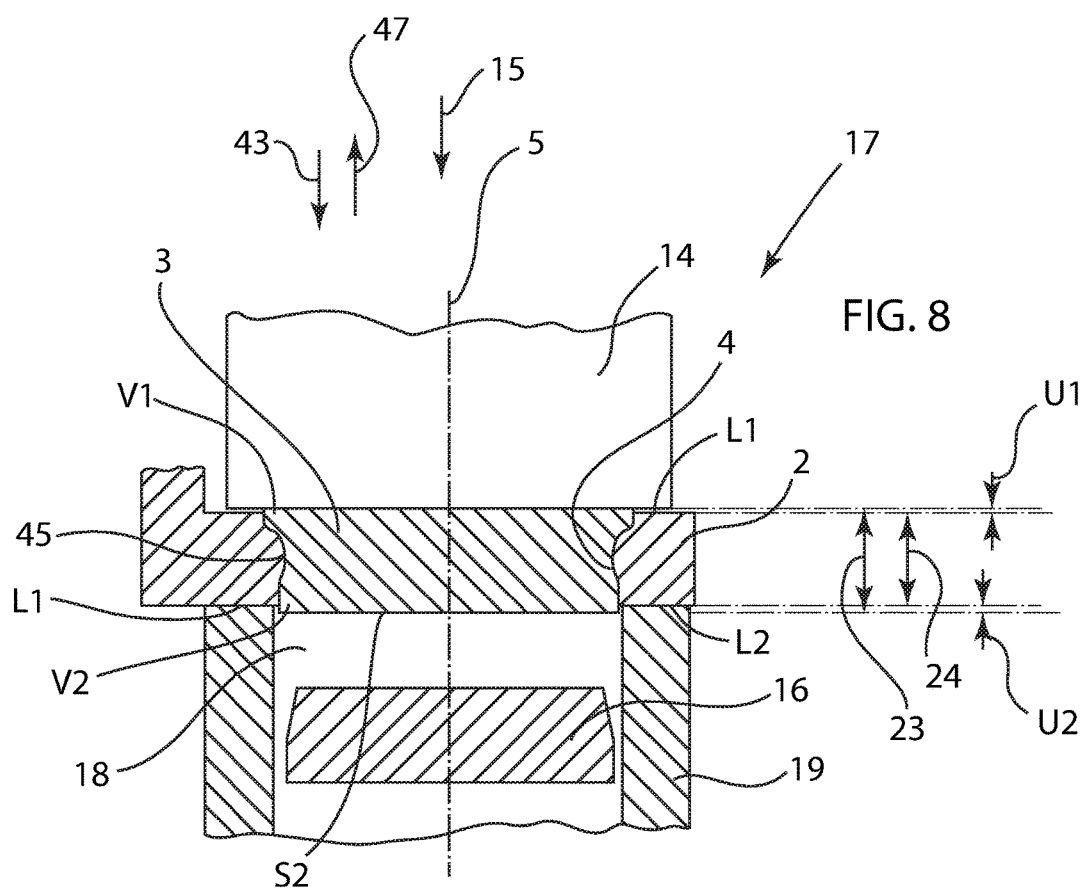
FIG. 8 shows the punching of the welding element into the assembly part, using a punch and a die.
Figure 12A:
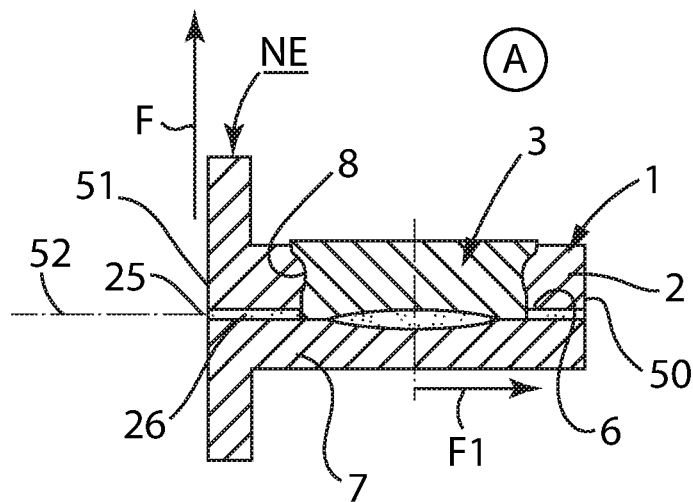
FIGS. 12A-12D show a comparison of assembly units with welding elements of different contours.
Figure 12B:
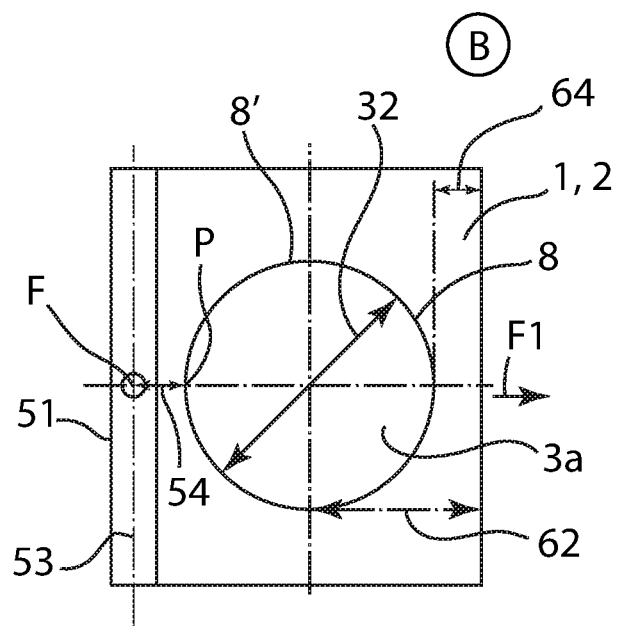
Figure 12C:
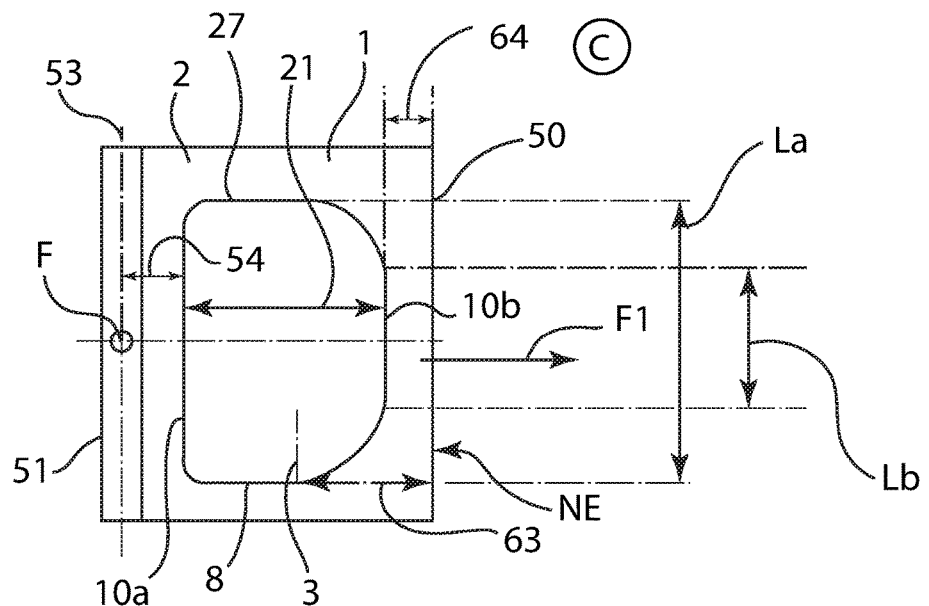
Figure 12D:
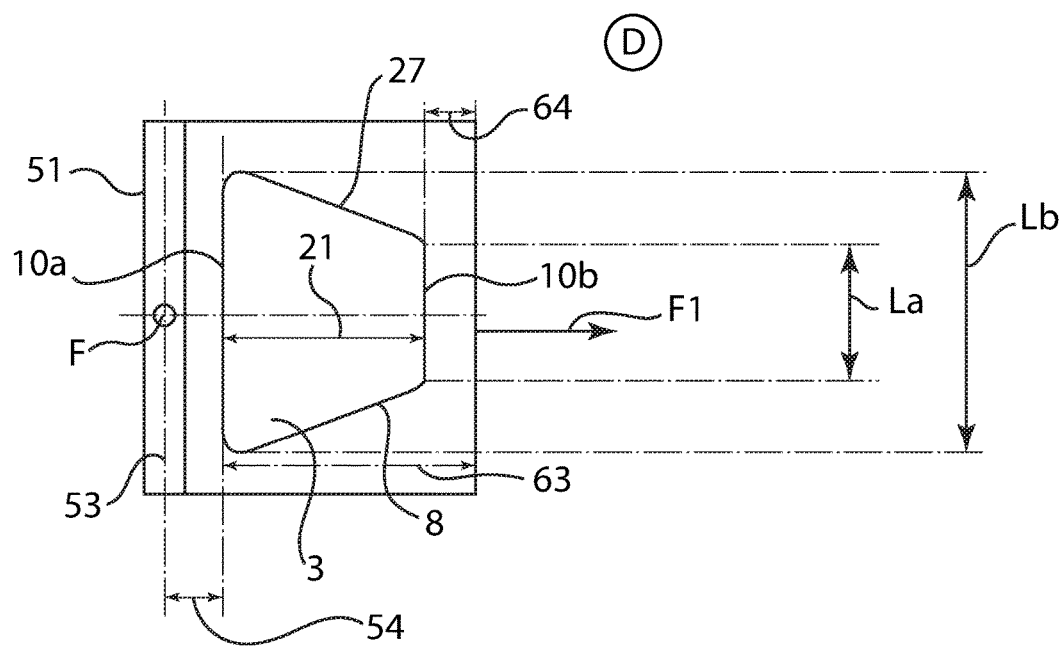

The welding element 3 is either introduced into a through opening 4 (not shown) already present in the flange 2, or a self-punching welding element 3 is preferably used. This is pressed into the flange 2 in a joining direction 15, with the second end face S2 to the fore, with the aid of a punch 14. The welding element 3 here itself punches the through opening 4, with the ejection of a welding slug 16. As can be seen from FIG. 8, a machining station 17 which serves this purpose comprises a die 19 which is breached by a central opening 18 and against which the flange 2 is supported with a face region which corresponds to the hole rim region L2 assigned to the second end face S2. The central opening 18 has a contour corresponding to the contour of the welding element 3, wherein its dimensions in the latitudinal and longitudinal direction with respect to the end face 2 are slightly larger than those of the welding element 3.

The axial distance between the first and second end face S1, S2 of the welding element 3, or the thickness 23 of this latter, is either equal to the thickness 24 of the flange 2 or greater than this. In the first case, the first and second end face S1, S2 of the welding element 3 are aligned with the respective hole rim regions L1, L2 of the flange 2 (not shown). In the second case, the welding element protrudes with a protrusion Ü1 from the first hole rim region L1 and/or with a second protrusion Ü2 from the second hole rim region L2. The effect of the protrusion Ü2 is that, in the final assembly state according to FIG. 10, a gap 25 remains between the connecting surface 6 of the basic construction 7 and the flange 2, which gap can be filled with a material layer 26, for instance an adhesive or an insulating compound.

Those peripheral portions of the peripheral surface 8 which connect the profiled side faces 10, and which are hereinafter referred to as transverse surfaces 27, are preferably designed such that they likewise form with the through opening 4 at least one form closure in the direction of the center longitudinal axis 5 thereof, as is explained in greater detail further below. The corners between the side faces 10 of the welding element 3 and the transverse surfaces 27 are preferably rounded. Such a design should particularly be provided in respect of assembly units ME which are exposed to a vibratory load.

The introduction or punching of the welding element 3 into the assembly part 1 can also be conducted, at variance with the above-described procedure, such that, simultaneously with the punching operation or subsequently, a recess 28 is impressed in that hole rim region L2 of the through opening 4 which is assigned to the second end face S2. This procedure serves the purpose of displacing material of the assembly part into the profile of the side faces 10. Such a material displacement can also be expedient for that region of the hole rim region L2 which borders the transverse surfaces 27. The impression by the die 19', which takes place simultaneously with the punching operation, additionally has the advantage that the welding element 3, when pressed into the flange 2 of the assembly part 1, penetrates into the central opening 18 of the die 19', whereby the generated punching slug 16 can be reliably separated from the assembly part 1 and thus disposed of.

The welding elements 3 are preferably produced by virtue of the fact that longitudinal portions 3', which form welding elements 3, are separated from a strip 29, whose narrow sides running in the longitudinal direction of the strip have a profile 13 corresponding to the side faces 10 of the welding element 3. The strip 29 is preferably an extruded profile. This is advantageous insofar as virtually any chosen profile shapes can be produced in a simple manner with high precision. The separation of the longitudinal portions 3' or of the welding elements 3 is realized with a machining station 30 comprising a parting tool, preferably a shearing tool. The shearing tool has two fixed blades 33 and a movable blade 34. The strip 29 rests with its bottom side 35, which forms the second end face S2 of the subsequent welding elements 3, on the fixed blades 33. These are spaced sufficiently far apart in the longitudinal direction of the strip 29 that a blade clearance 37 is present between them and the movable blade 34. It is thereby ensured that, when a longitudinal portion 3' is separated from the strip 29, there is formed a welding element 3 having transverse surfaces 27 which, viewed in the thickness direction of the welding element 3 or in the joining direction 15, have a cut surface 38 and a thereto adjoining rupture surface 39.

Figure 2:
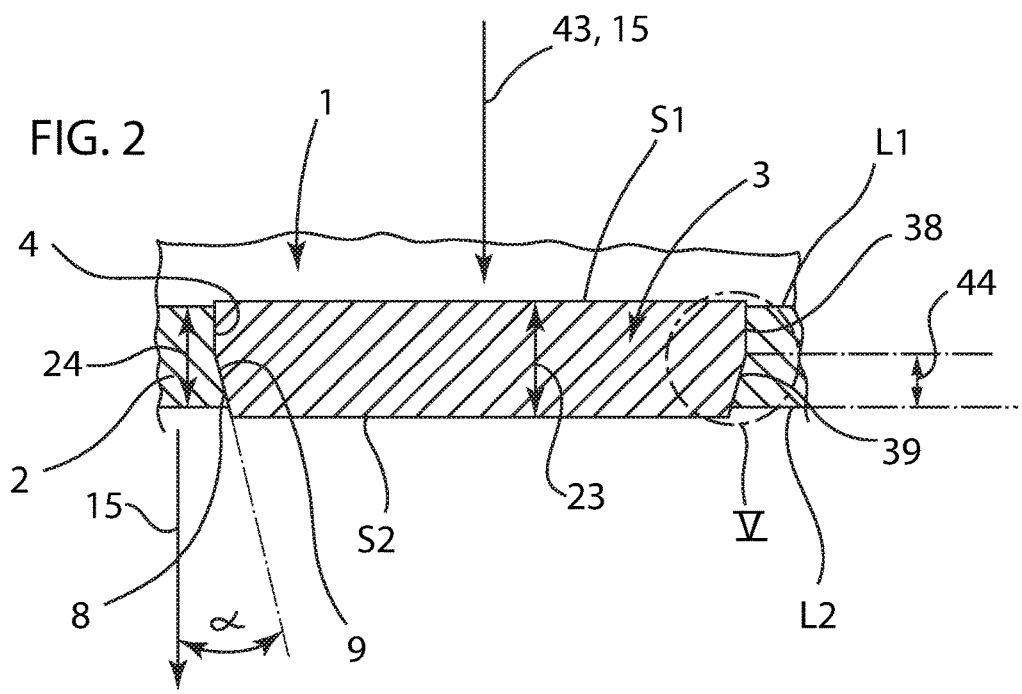
FIG. 2 shows a section in accordance with the line II-II in FIG. 1.
Figure 5:
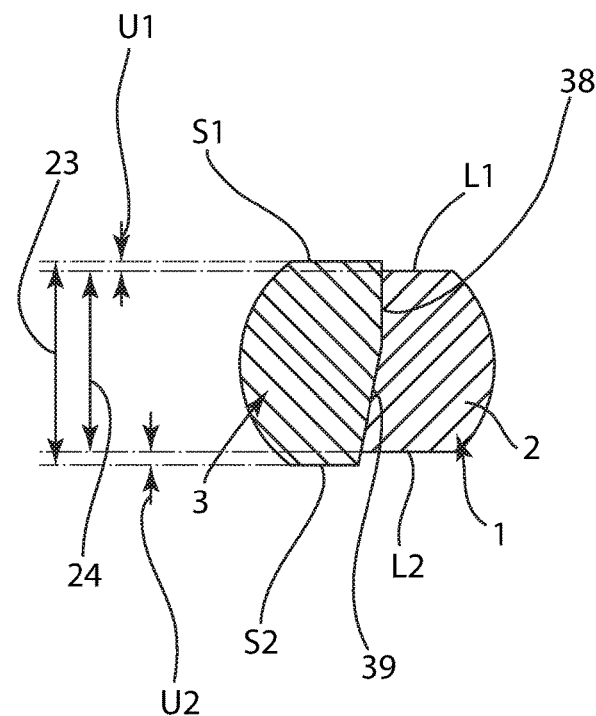
FIG. 5 shows the detail V from FIG. 2.
Figure 6:
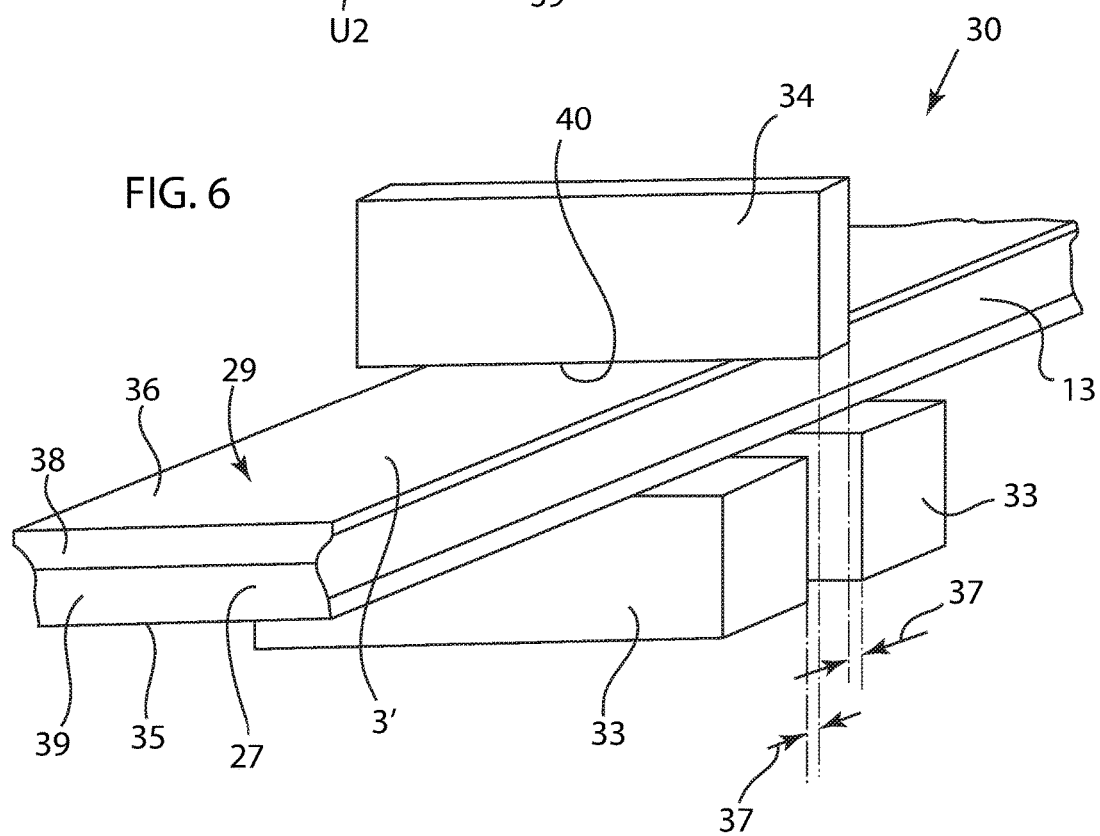
FIG. 6 shows a representation illustrating the separation of welding elements from a strip.
Figure 7:
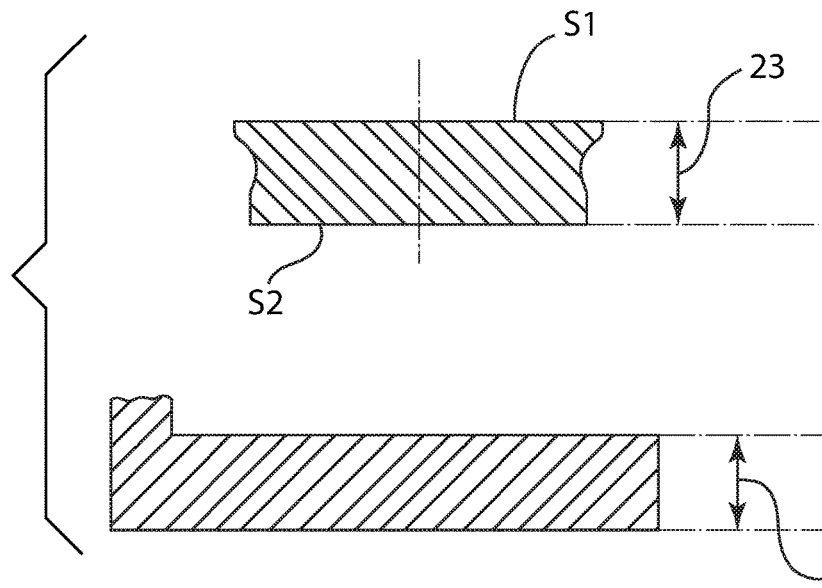
FIG. 7 shows a welding element and an assembly part in a preassembly situation, in which said parts are arranged in a predefined spatial location one to another.

The cut surface 38 is shaped by the movable blade 34 when its shearing edges 40 extending parallel to the strip top side 36 and at right angles to the strip longitudinal direction penetrate into the strip 29. After a certain depth of penetration of the blade 34, a material rupture and the formation of the rupture surface 39 ensue. This forms with the joining direction 15 or the center longitudinal axis 5 of the through opening an angle α (FIG. 2) which opens in the direction of the end face S2 of the welding element 3. The consequence of the obliquely running rupture surface 39 is that the welding element 3 is held in the through opening 4 with a form closure in the joining direction 15 extending at right angles in the direction of the first end face S1 or in the pull-through direction 43. The strength of the form closure in this direction or the pull-through strength of the connection between the welding element 3 and the flange 2 of the assembly part 1 is based substantially on the shearing cross section 44 derived from the obliquely running rupture surface 39 (FIG. 2).

The machining station 30 which serves to separate a welding element 3 from the strip 29 is linked with the machining station 17 which serves to punch a welding element 3 into the assembly part 1, preferably in such a way that a welding element 3 separated from the strip 29 is fed to the of the machining station 17 such that its second end face S2 points in the joining direction 15. The welding elements 3 produced from the strip 29 can also however be fed as single elements to the machining station 17. Such a procedure is sensible, for example, when the entire surface of the welding elements 3, due to high anticorrosion requirements, must be provided with a coating.

The profile 13 is shaped such that the welding element 3 is held in the through opening 4 with a form closure in the pull-through direction 43. The side faces 10 have for this purpose an approximately centrally arranged groove 45 extending in their longitudinal direction, which groove is flanked by two projections V1 and V2. The groove 45, and the transitions 46 between this and the projections V1, V2, are rounded. That form closure of the welding element 3 which acts in the pull-through direction 43 is ensured by the projection V1. A form closure in the opposite direction, namely in the press-out direction 47, is effected by the second projection V2 (FIG. 4A). A form closure in the press-out direction 47 serves to hold the welding element 3 during handling and transport of an assembly unit ME captively in the through opening of the assembly part 1. The same purpose is also served by that form closure which acts in the pull-through direction 43, which form closure is obtained by the projection V1. As soon as, however, the welding element 3 of an assembly unit ME is connected to a basic construction 7, only the form closure in the pull-through direction 43 remains critical to the strength of the connection between the assembly unit ME and the basic construction 7. Accordingly, the form closure attributable to the first projection V1 is configured stronger than that of the second projection V2. This derives from the fact that the projection V1 juts laterally further out of the side face 10 than the projection V2. Moreover, the projections V1, V2, viewed in the direction of thickness of the welding element 3, are differently dimensioned such that the shearing cross section 48 produced by the first projection V1 is greater than that shearing cross section 49 relating to the second projection V2 (FIG. 4B).

In the case of a peeling stress of the abovementioned type, in order to prevent detachment of the assembly part 1 from the welding element 3 or to increase the pull-through strength of the connection between the welding element 3 and the assembly part 1, it is expedient if the side face 10a facing away from the outer rim 50 of the flange 2 has a length La which is equal to or greater than the length Lb of the side face 10b facing toward the outer rim 50 (FIG. 12). It is thereby ensured that a greatest possible resistance is offered to a force F acting on the inner rim 51 and running approximately at right angles to the flat plane 52 spanned by the flange 2. The greater is the length La of the side face 10a, the greater is the resistance. Moreover, due to the rectilinear course, all points on the side face 10a have substantially the same short distance 54 to that region 53 of the assembly part 1 which is acted on by the force F. A lever effect promoting the detachment of the assembly part 1 from the welding element 3 is thus relatively small. In the traditional assembly unit ME represented in FIG. 12 B, the welding element 3a of which has a diameter 32 that corresponds to the width 21, measured between the side faces 10, of the welding elements 3 of the assembly units ME according to the invention, a different situation exists. In this case, only a single point P on the peripheral surface 8 of the welding element 3 has a distance to the region 53 which corresponds to the constant distance 54 found in FIGS. 12 C and D. All other places or points on half the peripheral surface 8' of the circular welding element 3a from FIG. 12, which peripheral surface half is effective in terms of a peeling stress, exhibit, by contrast, a greater distance with correspondingly large lever effect.

A further advantage of an assembly unit ME produced with the proposed method is that, not only in terms of the profile 13 of the side faces 10 of the welding element 3, but also in relation to the shape or course of the transverse surfaces 27, a large number of variation options exist. Thus, for example, the strength or load-bearing capacity of the connection between the assembly unit ME and the basic construction 7 in terms of a shearing load, i.e. a subjection of the flange 2 of the assembly part 1 to a force F1 acting parallel to the flat plane 52 spanned by the flange 2, can be increased in relation to a traditional circular welding element 3a. While its contribution to the shearing cross section 62 is limited to half the diameter 32 of the welding element 3a, in an assembly unit ME according to the invention the welding element 3 can contribute with unequal side faces 10a, 10b, even with its entire width 21, to the shearing cross section 62, as is the case in the illustrative embodiment of FIG. 12 D. The distance 64 between the welding elements 3, 3a which is included in the shearing cross section 62, 63 is equal in FIGS. 12 B-D.

Figure 13:
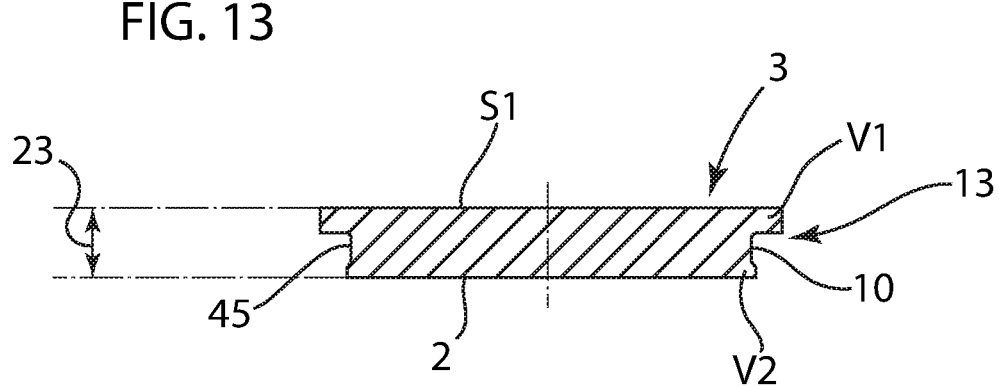
FIG. 13 shows a welding element having a laterally protruding flange assigned to its first end face.
Figure 14:
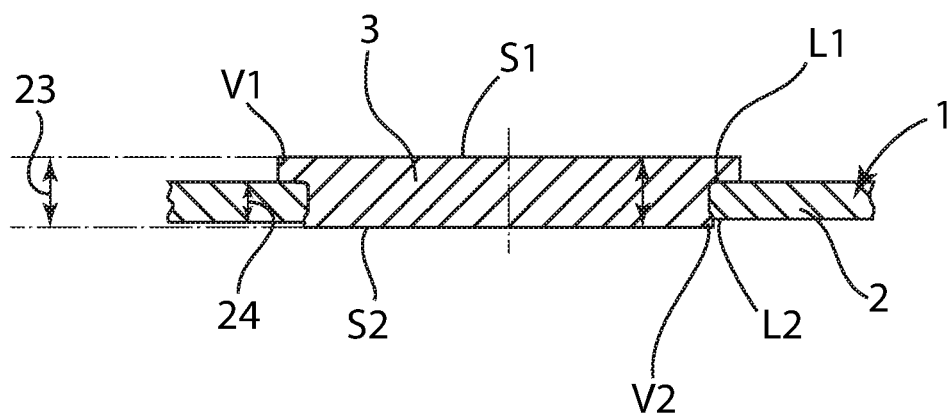
FIG. 14 shows an assembly unit having the welding element of FIG. 13.
Figure 15:
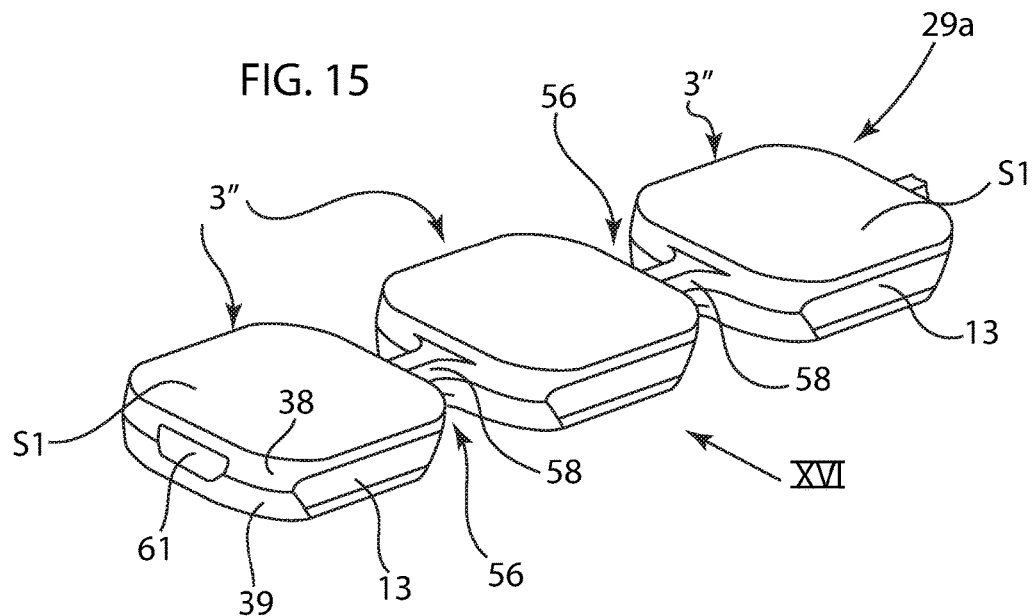
FIG. 15 shows an alternatively designed strip, in which the individual welding elements are already largely preformed and are connected to one another via a connecting web.
Figure 16:
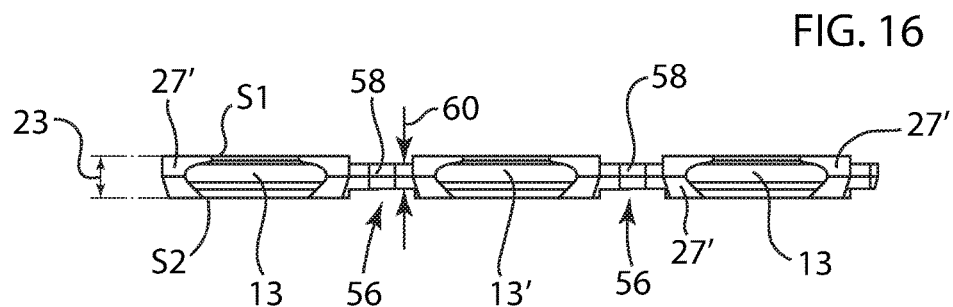
FIG. 16 shows a side view in the direction of the arrow XVI in FIG. 15.

In FIG. 13 is shown a welding element 3 which is particularly suitable for punching or introduction into thin assembly parts 1 or flanges 2. In assembly parts of this kind, a sufficient pull-through strength or a form closure between the assembly part 1 and the welding element in the pull-through direction 43 can be achieved in the above-described manner only with difficulty. A form closure of this type is here achieved by the first projection V1 protruding laterally from the side faces 10 to such extent that it bears against the first hole rim region L1 of the flange 2. The thickness 23 of the welding element 3 is thus correspondingly greater than the thickness 24 of the flange 2 in the hole rim regions L1, L2.

In a preferred method variant, the separation of the welding elements 3 from the strip 29 is realized in two steps. In a first step, partial joints 56 are made in the strip 29 such that strip longitudinal portions 3" corresponding to the subsequent welding elements 3 are formed or preformed, which portions differ from the subsequent welding elements 3 by virtue of the fact that they are connected to one another via a connecting web 58 extending in the longitudinal direction of the strip. Due to the increased flexibility as a result of the connecting webs, such a strip 29a can be rolled up easily in a space-saving manner, and in particular without warping of the strip longitudinal portions 3", and accommodated, for example, in a strip magazine 55 (FIG. 11). The partial joints 56 are preferably produced such that partial transverse surfaces 27', which are configured like the transverse surfaces 27 of the subsequent welding elements 3, thus, like these, have a cut surface 38 and an obliquely running rupture surface 39, are formed.

In a second step, preferably in a machining station (not shown) which is arranged upstream of the machining station 17 serving to introduce welding elements 3 into the assembly part 1 and which substantially corresponds to the machining station according to FIG. 11, the connecting webs 58 are removed largely, for instance, by shearing. Prior to implementation of the second step, the strip 29a can be provided, preferably in full, with a coating 59 (dotted areas in FIG. 17). The coating can serve, in particular, to prevent direct contact between the welding element 3 and the assembly part 1, i.e. contact corrosion. Where appropriate, it may be expedient, with a view to the subsequent welding of the welding elements 3 to the basic construction 7, not to coat the second end faces S2.

With regard to the flexibility of the strip 29a, it is expedient to produce the partial joints 56 such that the connecting webs 58 have a lesser thickness 60 than the strip 29a or the strip longitudinal portions 3" which form the subsequent welding elements 3. With regard to prevention of contact corrosion, it is advantageous if the connecting webs 58 do not extend as far as the first end face of the strip longitudinal portions 3" or welding elements 3. Extending between the first end face S1 and the connecting webs 58 is in this case a surface region 61, which connects the two partial transverse surfaces 27' one to the other. The coating 59 present on the surface region 61 prevents the formation in this region of contact corrosion with the wall 9 of the through opening 4 in the assembly part 1.

Figure 17:
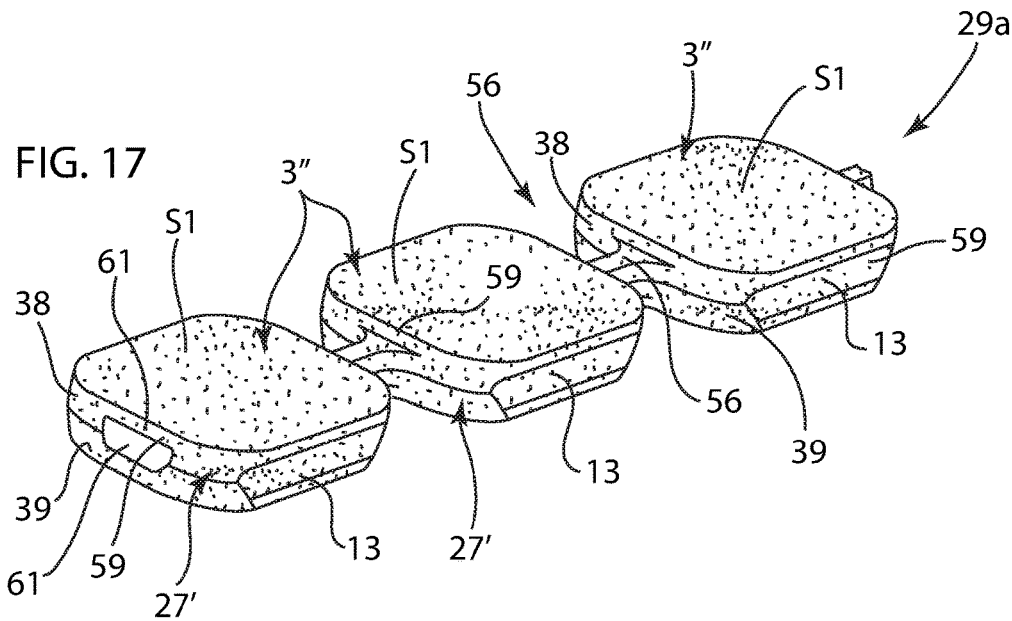
FIG. 17 shows the strip of FIG. 15, wherein its surface is provided with a coating.

If the cross-sectional area of the connecting webs 58 is kept small, it can be assumed that, upon their separation, the coating 59 of a surface region bordering the connecting web 58, for instance the surface region 61, is spread with the aid of the parting tool over the formed parting surface 61 and this acquires a certain corrosion protection, insofar as this is at all necessary. Moisture should barely penetrate to the parting surface 61 of the welding element 3 pressed into the through opening 4 of the assembly part 1, since the parting surface 61 according to FIG. 17 is fully bounded by the coating 59.

REFERENCE SYMBOL LIST 1 assembly part
2 flange
3 welding element
3' longitudinal portion
4 through opening
5 center longitudinal axis
6 connecting surface (on 7)
7 basic construction
8 peripheral surface
9 wall (of 4)
10 side face
13 profile
14 punch
15 joining direction
16 welding slug
17 machining station
18 central opening
19 die
20 diameter (of 18)
21 width
23 thickness (of 3)
24 thickness (of 2)
25 gap
26 material layer
27 transverse surface
28 recess
29 strip
30 machining station (inside)
31 welding zone
32 diameter
33 fixed blade
34 movable blade
35 bottom side
36 top side
37 blade clearance
38 cut surface
39 rupture surface
40 shearing edge
43 pull-through direction
44 shearing cross section
45 groove
46 transition
47 press-out direction
48 shearing cross section V1
49 shearing cross section V2
50 outer rim (of 2)
51 inner rim
52 flat plane
53 region (of 2)
54 distance
55 strip magazine
56 partial joint
58 connecting web
59 coating
60 thickness (of 58)
61 parting surface
62 shearing cross section
63 shearing cross section
64 distance
S1 first end face
S2 second end face
L1 first hole rim region
L2 second hole rim region
ME assembly unit

The invention claimed is:

1. A method for producing an assembly unit, the method comprising the following steps:
providing an assembly part;
providing at least one welding element for thermally joining the assembly part to a construction, the at least one welding element having a first end face, a second end face facing away from the first end face and a peripheral surface interconnecting the end faces, the peripheral surface having two side faces running parallel to each other and pointing away from each other and the peripheral surface having a profile and two transverse surfaces interconnecting the side faces;
introducing the at least one welding element into the assembly part in a joining direction with the second end face leading; causing the at least one welding element to be fixed in a through opening of the assembly part with at least one form-locking connection acting in a direction of a center longitudinal axis of the through opening and causing the profile to ensure the at least one form-locking connection;
producing the at least one welding element by separating a longitudinal portion from a strip having sides extending in a longitudinal direction of the strip and having the profile corresponding to the side faces of the at least one welding element; and providing the transverse surfaces with a cut surface extending away from the first end face and running parallel to the joining direction and providing a rupture surface adjoining the cut surface and forming an acute angle with the joining direction opening in the direction of the second end face, during the separation of the at least one welding element from the strip.

2. The method according to claim 1, which further comprises producing the strip by an extrusion process.

3. The method according to claim 1, which further comprises forming rounded corners between the side faces and the transverse surfaces of the at least one welding element during the separation of the at least one welding element from the strip.

4. The method according to claim 1, which further comprises feeding the at least one welding element separated from the strip to a machining station which introduces the at least one welding element into the assembly part with the second end face pointing in the joining direction.

5. The method according to claim 1, which further comprises impressing a recess into a hole rim region of the through opening containing the at least one welding element in order to displace material of the assembly part into the profile of the side faces.

6. The method according to claim 1, wherein the at least one welding element is self-punching.

* * * * *